United States Patent
Markanday et al.

(10) Patent No.: US 11,685,819 B2
(45) Date of Patent: Jun. 27, 2023

(54) POLYOLEFIN COMPOSITIONS WITH IMPROVED OXYGEN SCAVENGING CAPABILITY

(71) Applicant: SABIC GLOBAL TECHNOLOGIES B.V., Bergen op Zoom (NL)

(72) Inventors: Meghna Markanday, Geleen (NL); Mohamed Ashraf Moideen, Geleen (NL); Venkata Ramanarayanan Ganapathy Bhotla, Geleen (NL); Anantharaman Dhanabalan, Geleen (NL)

(73) Assignee: SABIC GLOBAL TECHNOLOGIES B.V., Bergen Op Zoom (NL)

( * ) Notice: Subject to any disclaimer, the term of this patent is extended or adjusted under 35 U.S.C. 154(b) by 124 days.

(21) Appl. No.: 17/298,211

(22) PCT Filed: Dec. 4, 2019

(86) PCT No.: PCT/EP2019/083684
§ 371 (c)(1),
(2) Date: May 28, 2021

(87) PCT Pub. No.: WO2020/115136
PCT Pub. Date: Jun. 11, 2020

(65) Prior Publication Data
US 2022/0089841 A1 Mar. 24, 2022

Related U.S. Application Data

(60) Provisional application No. 62/776,471, filed on Dec. 7, 2018.

(51) Int. Cl.
| | | |
|---|---|---|
| *C08K 13/02* | (2006.01) | |
| *B32B 27/08* | (2006.01) | |
| *B32B 27/20* | (2006.01) | |
| *B32B 27/32* | (2006.01) | |
| *C08J 5/18* | (2006.01) | |
| *C08K 3/08* | (2006.01) | |
| *C08K 3/30* | (2006.01) | |

(52) U.S. Cl.
CPC .............. *C08K 13/02* (2013.01); *B32B 27/08* (2013.01); *B32B 27/20* (2013.01); *B32B 27/32* (2013.01); *C08J 5/18* (2013.01); *B32B 2264/1056* (2020.08); *B32B 2307/72* (2013.01); *B32B 2307/732* (2013.01); *B32B 2307/74* (2013.01); *B32B 2439/70* (2013.01); *C08J 2323/06* (2013.01); *C08J 2323/08* (2013.01); *C08J 2351/06* (2013.01); *C08K 2003/0856* (2013.01); *C08K 2003/3072* (2013.01); *C08K 2201/005* (2013.01)

(58) Field of Classification Search
CPC ......... B32B 27/08; B32B 27/20; B32B 27/32; B32B 2264/1056; B32B 2307/72; B32B 2307/732; B32B 2307/74; B32B 2439/70; C08K 13/02; C08K 2003/0856; C08K 2003/3072; C08K 2201/005; C08J 2323/06; C08J 2323/08; C08J 2351/06; C08J 5/18
See application file for complete search history.

(56) References Cited

U.S. PATENT DOCUMENTS

| | | | |
|---|---|---|---|
| 4,104,192 | A | 8/1978 | Yoshikawa et al. |
| 4,359,540 | A | 11/1982 | McEntire et al. |
| 4,856,650 | A | 8/1989 | Inoue |
| 4,992,410 | A | 2/1991 | Cullen et al. |
| 5,153,038 | A | 10/1992 | Koyama et al. |
| 5,744,056 | A | 4/1998 | Venkateshwaran et al. |
| 6,369,148 | B2 | 4/2002 | Chiang et al. |
| 6,586,514 | B2 | 7/2003 | Chiang et al. |
| 9,359,485 | B2 | 6/2016 | Menozzi et al. |
| 2007/0241309 | A1 | 10/2007 | Uradnisheck |

FOREIGN PATENT DOCUMENTS

| | | | |
|---|---|---|---|
| JP | 5660642 | A | 5/1981 |
| JP | 5680705 | A | 7/1981 |
| JP | 5830914 | A | 2/1983 |
| JP | 5681523 | B2 | 3/2015 |

OTHER PUBLICATIONS

English machine translation or JP5681523B (Mar. 11, 2015). (Year: 2015).*
English machine translation of JP2002080647A (Mar. 19, 2002). (Year: 2002).*
International Search Report for International Application No. PCT/EP2019/083684, International Filing Date Dec. 4, 2019, dated Apr. 30, 2020, 5 pages.
Written Opinion for International Application No. PCT/EP2019/083684, International Filing Date Dec. 4, 2019, dated Apr. 30, 2020, 7 pages.

* cited by examiner

*Primary Examiner* — Michael C Miggins
(74) *Attorney, Agent, or Firm* — Cantor Colburn LLP

(57) ABSTRACT

Oxygen scavenging polymeric compositions that possess an improved oxygen scavenging capability and can be formed into transparent/translucent thin films are disclosed. A composition can include iron powder, ferrous sulfate heptahydrate ($FeSO_4 \cdot 7H_2O$) and glycerol dispersed in polyethylene. Such compositions are useful for creating packaging films with improved oxygen scavenging capability.

18 Claims, No Drawings

POLYOLEFIN COMPOSITIONS WITH IMPROVED OXYGEN SCAVENGING CAPABILITY

CROSS REFERENCE TO RELATED APPLICATIONS

This application is a National Stage application of PCT/EP2019/083684, filed Dec. 4, 2019, which claims the benefit of U.S. Provisional Application No. 62/776,471, filed Dec. 7, 2018, both of which are incorporated by reference in their entirety herein.

The invention relates to polyolefin compositions that have improved oxygen scavenging capability.

Many products have to be kept in a closed volume or package with little or almost no oxygen. These oxygen-sensitive products include pharmaceuticals, meats, cheese, smoked and processed luncheon meats, beverages, etc. that are susceptible for degradation due to the presence of oxygen. The oxidation of lipids within the food product can result in the development of rancidity, due to which both the colour and the flavour of foods can be adversely affected. Limiting the exposure to oxygen provides a means to maintain and enhance the quality and the shelf life of the packaged product.

The removal of oxygen from the packaged foods in the headspace and building barriers against oxygen penetration during storage represent an important objective for newer developments in the food packaging technology. For example, packaging a food product in a package capable of minimizing oxygen exposure is a means to maintain the quality of the packaged product over an extended time and to retard spoilage of the product. This allows the packaged product to be maintained in inventory longer without wastage or the need of restocking and replacement.

In the food packaging industry, several techniques have been developed to limit oxygen sensitive packaged materials to oxygen exposure. Such techniques include:
1. The use of barrier material (with low permeability to oxygen) as part of the packaging;
2. The inclusion of some means capable of consuming oxygen other than the packaging material (through the use of sachets with material capable of reacting with oxygen); and,
3. The creation of a reduced oxygen environment within the package (e.g. modified atmosphere packaging ("MAP") and vacuum packaging).

Even if each of the above techniques has its place in the industry, it is well recognized that the inclusion of an oxygen scavenger as a part of the packaging article is one of the most desirable means of limiting oxygen exposure.

One difficulty with scavenger systems incorporating an oxidisable metal (e.g., iron) and a metal halide (e.g., sodium chloride) into a thermoplastic layer is the inefficiency of the oxidation reaction. To obtain sufficient oxygen absorption in active-barrier packaging, high loadings of scavenger composition are often used. This typically requires sheets, films and other packaging layer or wall structures containing a scavenging composition be relatively thick. This, in turn, contributes to cost of packaging material and may preclude attainment of thin packaging films having adequate oxygen-scavenging capabilities. For instance, the incorporation of high loadings of scavenger composition adversely affects the mechanical and optical characteristics of thin packaging films.

Another method of limiting the package contents from interacting with oxygen is via physical blocking (mechanical barrier to oxygen). Product sensitive to oxygen, particularly foods, beverages and medicines, deteriorate or spoil in the presence of oxygen. One of the approaches to alleviate these difficulties is to package such products with packaging materials containing at least one layer of a so-called "passive" gas barrier film that can act as a physical barrier to transmission of oxygen but does not react with oxygen. Films of ethylene vinyl alcohol copolymer (EVOH) or polyvinylidene dichloride (PVDC) are commonly used for this purpose due to their excellent oxygen barrier properties. By physically blocking transmission of oxygen, these barrier films can limit or substantially limit the initial oxygen levels within a package. But passive barrier films may still permit a low level of oxygen (and a high level of oxygen upon exposure to high humid conditions) to pass through. Further, passive barrier films do not reduce levels of oxygen already present (generated due to respiration of food and during processing of package) in the packaging construction. Hence, there is a need for effectively scavenging the residual oxygen, as well as the in-situ oxygen generated from the food itself, from the headspace of the food package.

An approach for achieving or maintaining a low oxygen environment inside a package (headspace) is to use a sachet containing an oxygen absorbent material. The packet, also sometimes referred to as a pouch, is placed in the interior of the package along with the product. Sakamoto et al. disclosed the use of oxygen absorbent packets in food packages in Japan Patent Application No. 81-121634/81. A typical ingredient used in the oxygen scavenger carried in the packet is reduced iron powder that can react with oxygen to form ferrous oxide or ferric oxide, as disclosed in the U.S. Pat. No. 4,856,650. In addition, it is known to include in the packet, along with iron, a reaction promoter such as sodium chloride, and a water-absorbing agent, such as silica gel, as described in the U.S. Pat. No. 4,992,410. Japan Patent Application No. 82-24634 (1982) discloses an oxygen absorber composition comprising 100 parts by weight (pbw) iron powder, 2 to 7 pbw ammonium chloride, 8 to 15 pbw aqueous acid solution and 20 to 50 pbw of a slightly water soluble filler such as activated clay. Japan Patent Application No. 79-158386 (1979) discloses an oxygen arresting composition comprising a metal, such as iron, copper or zinc, and optionally, a metal halide such as sodium chloride or zinc chloride at a level of 0.001 to 100 pbw to 1 pbw of metal, and a filler such as clay at a level of 0.01 to 100 pbw to 1 pbw of metal.

Although oxygen absorbent or scavenger materials used in packets can react chemically with oxygen in the package, also sometimes referred to as "headspace oxygen", they do not prevent external oxygen from penetrating into the package. Therefore, it is common for packaging in which such packets are used to include additional protection such as wrappings or passive barrier films of the type described above. This adds to product costs. With many easy-to-prepare foods, another difficulty with oxygen scavenger packets is that consumers may mistakenly open them and consume their contents together with the food. Moreover, the extra manufacturing step of placing a packet into a container can add to the cost of the product and slower production rates. Further, oxygen absorbent packets are not useful with liquid products.

Unfortunately, iron based oxygen scavenging sachets have their own drawbacks when used in food packaging. These drawbacks include incompatibility with metal detectors.

In view of these disadvantages and limitation, it has been proposed to incorporate "active" oxygen absorber directly within the thin packaging films itself. Such a packaging film is made-up of a composition that reacts with oxygen permeating through the film. Such a packaging is said to provide an "active-barrier" as distinguished from passive barrier films that just physically block transmission of oxygen but do not react with it. Active-barrier packaging is an attractive way to protect oxygen-sensitive products because it not only can prevent oxygen from reaching the product from the outside but also can absorb oxygen present within a packed container. One approach for obtaining active-barrier packaging is to incorporate a mixture of an oxidisable metal (e.g., iron) and an electrolyte (e.g., sodium chloride) into a suitable resin via a melt process, the resultant composition converted into a single layer or multilayer sheets or films for packaging applications. This type of active-barrier is disclosed in Japan Patent Application No. 56-60642 (1981), directed to an oxygen-scavenging sheet composed of a thermoplastic resin containing iron, zinc or copper and a metal halide. Disclosed resins include polyethylene and polyethylene terephthalate. Sodium chloride is the preferred metal halide. Similarly, the U.S. Pat. No. 5,153,038 discloses plastic multilayer vessels of various layer structures formed from a resin composition comprising of an oxygen scavenger, and optionally a water absorbing agent, in a gas barrier resin. The oxygen scavenger can be a metal powder such as iron, low valence metal oxides or reducing metal compounds.

The oxygen scavenger composition can be a combination of compounds such as a metal hydroxides, metal carbonate, metal sulfite, metal thiosulfite, tertiary phosphate, secondary phosphate, organic acid salt or halide of an alkali metal or alkaline earth metal. The water-absorbing agent can be an inorganic salt such as sodium chloride, calcium chloride, zinc chloride, ammonium chloride, ammonium sulfate, sodium sulfate, magnesium sulfate, disodium hydrogen phosphate, sodium dihydrogen phosphate, potassium carbonate or sodium nitrate. The oxygen scavenger can be present at 1 to 100 wt. % based on the weight of the barrier resin. The water-absorbing agent can be present at 1 to 100 wt. % based on the weight of the barrier resin.

One of the difficulties with in-film scavenger systems obtained via incorporating an oxidisable metal (e.g., iron) and a metal halide (e.g., sodium chloride) into a thermoplastic layer is the inefficiency of the oxidation of metal. Conventionally, it is observed that the powder state additive like iron powder etc., can get oxidized quickly but when processed in a polymer film, the permeability of oxygen into the matrix is much slower as compared to direct exposure in powder state, and thus, there is an overall dip in the rate of oxidation. To obtain sufficient oxygen absorption in active-barrier packaging, high loadings of scavenger composition are often used (10-20 wt. %). This typically requires that sheets, films and the other packaging layer or wall structures containing a scavenging composition be relatively thick. Moreover, the incorporation of a very high loading of scavenger composition leads to deterioration of mechanical and optical characteristics. Additionally, this, in turn, contributes to cost of packaging material and may preclude attainment of thin packaging films having adequate oxygen-scavenging capabilities.

Another oxygen-scavenging composition, disclosed in U.S. Pat. No. 4,104,192, comprises a dithionite and at least one compound having water of crystallization or water of hydration. Listed among these compounds are various hydrated sodium salts, including carbonate, sulfate, sulfite and phosphates, for example, sodium pyrophosphate decahydrate. The U.S. Pat. Nos. 5,744,056, 6,369,148 and 6,586,514 describe an oxygen scavenging composition comprising an oxidisable metal component, an electrolyte component, and a non-electrolytic acidifying component that is thermally stable at thermoplastic resin melt processing temperatures.

Thus, while a variety of approaches for maintaining or reducing oxygen levels in packaged items have been proposed, there remains a need for an improved oxygen-scavenging composition and packaging materials utilizing the same. Many organic oxygen-scavenging additives (pyrogallol, gallic acid, polybutadiene, enzymes, vitamin C etc.) have also been reported in various patent & non-patent literature. Howsoever, most of these do not have commercial viability.

An object of the present invention is therefore to provide polyolefin-based compositions that can be processed into thin films and exhibit an improved oxygen scavenging capability for use in food packaging applications.

The inventive composition uses the acceleration of kinetics of oxidation of iron particles dispersed in a polyolefin thin film with the incorporation of glycerol. The incorporation of glycerol improves the dispersion of iron powder and ferrous sulfate heptahydrate salt in the polyolefin matrix and provides a medium for uniform distribution of water/wetting throughout the entire composition. This is apart from acting as a moisture absorber for accelerating the oxidation of iron and as a plasticizer to maintain the flexibility. The optional addition of an electrolyte, such as sodium chloride, can provide improved oxygen scavenging effects. The inventive polyolefin composition can be used for wider applications of active-barrier packaging films and sheets, including laminated and co-extruded multilayer films and sheets. Other objects will be apparent to those skilled in the art.

The present invention provides a solution for the above object by a film composition comprising a polymer matrix, preferably a polyolefin, iron, ferrous sulfate heptahydrate, and glycerol.

Such film composition demonstrates an improved oxygen scavenging effect when employed in films, whilst being capable of being converted into films under desirable processing conditions.

In another preferred embodiment, the polymer matrix is selected from the group comprising polyethylene, polypropylene, a polyethylene grafted compound, or a mixture of these.

In another preferred embodiment, the polyethylene is selected from the group comprising or consisting of high-density polyethylene, medium density polyethylene, low-density polyethylene, very low-density polyethylene, ultra-low density polyethylene or linear low-density polyethylene.

In another preferred embodiment, the polyethylene-grafted compound comprises or is maleic anhydride grafted polyethylene.

In another preferred embodiment, the polymer matrix comprises or is maleic anhydride grafted polyethylene mixed with polyethylene.

For example, the polymer matrix may be a linear low-density polyethylene (LLDPE). The LLDPE may for example have a density of $\geq 900$ kg/m$^3$ and $\leq 925$ kg/m$^3$, preferably $\geq 905$ and $\leq 925$ kg/m$^3$, more preferably $\geq 910$ and $\leq 922$ kg/m$^3$, even more preferably of $\geq 915$ and $\leq 922$ kg/m$^3$, as determined in accordance with ASTM D792 (2008).

For example, the LLDPE may have a melt mass-flow rate of $\geq 0.1$ and $\leq 20.0$ g/10 min, preferably $\geq 0.1$ and $\leq 10.0$ g/10 min, more preferably $\geq 0.5$ and $\leq 10.0$ g/10 min, even more preferably ≥0.5 and ≤5.0 g/10 min, as determined in accordance with ASTM D1238 (2013) at a temperature of 190° C. under a load of 2.16 kg.

For example, the LLDPE may be a copolymer comprising polymeric units derived from ethylene and polymeric units derived from an α-olefin selected from 1-butene, 1-hexene and 1-octene. For example, the LLDPE may be a copolymer comprising ≥80.0 wt %, preferably ≥85.0 wt %, more preferably ≥90.0 wt %, of polymeric units derived from ethylene, with regard to the total weight of the LLDPE, and polymeric units derived from an α-olefin selected from 1-butene, 1-hexene and 1-octene. For example, the LLDPE may be a copolymer comprising polymeric units derived from ethylene, and ≥2.5 wt %, preferably ≥5.0 wt %, of polymeric units derived from an α-olefin selected from 1-butene, 1-hexene and 1-octene, with regard to the total weight of the LLDPE. For example, the LLDPE may be a copolymer comprising ≥80.0 wt %, preferably ≥85.0 wt %, more preferably ≥90.0 wt %, of polymeric units derived from ethylene, and ≥2.5 wt %, preferably ≥5.0 wt %, of polymeric units derived from an α-olefin selected from 1-butene, 1-hexene and 1-octene, with regard to the total weight of the LLDPE.

For example, the polymer matrix is a medium-density polyethylene (MDPE). The MDPE may for example have a density of ≥926 kg/m$^3$ and ≤939 kg/m$^3$, preferably ≥926 and ≤935 kg/m$^3$, more preferably ≥930 and ≤935 kg/m$^3$, as determined in accordance with ASTM D792 (2008).

For example, the MDPE may have a melt mass-flow rate of ≥0.1 and ≤20.0 g/10 min, preferably ≥0.1 and ≤10.0 g/10 min, more preferably ≥0.5 and ≤10.0 g/10 min, even more preferably ≥0.5 and ≤5.0 g/10 min, as determined in accordance with ASTM D1238 (2013) at a temperature of 190° C. under a load of 2.16 kg.

For example, the polymer matrix may be a high-density polyethylene (HDPE). The HDPE may for example have a density of ≥940 kg/m$^3$ and ≤975 kg/m$^3$, preferably ≥945 and ≤965 kg/m$^3$, more preferably ≥945 and ≤960 kg/m$^3$, as determined in accordance with ASTM D792 (2008).

For example, the HDPE may have a melt mass-flow rate of ≥0.1 and ≤20.0 g/10 min, preferably ≥0.1 and ≤10.0 g/10 min, more preferably ≥0.5 and ≤10.0 g/10 min, even more preferably ≥0.5 and ≤5.0 g/10 min, as determined in accordance with ASTM D1238 (2013) at a temperature of 190° C. under a load of 2.16 kg.

For example, the polymer matrix may be a very low-density polyethylene (VLDPE). The VLDPE may for example have a density of ≥870 kg/m$^3$ and ≤899 kg/m$^3$, preferably ≥870 and ≤895 kg/m$^3$, as determined in accordance with ASTM D792 (2008).

For example, the VLDPE may have a melt mass-flow rate of ≥0.1 and ≤20.0 g/10 min, preferably ≥0.1 and ≤10.0 g/10 min, more preferably ≥0.5 and ≤10.0 g/10 min, even more preferably ≥0.5 and ≤5.0 g/10 min, as determined in accordance with ASTM D1238 (2013) at a temperature of 190° C. under a load of 2.16 kg.

For example, the polymer matrix may be an ultra-low-density polyethylene (ULDPE). The ULDPE may for example have a density of ≥850 kg/m$^3$ and ≤869 kg/m$^3$, preferably ≥855 and ≤869 kg/m$^3$, as determined in accordance with ASTM D792 (2008).

For example, the ULDPE may have a melt mass-flow rate of ≥0.1 and ≤20.0 g/10 min, preferably ≥0.1 and ≤10.0 g/10 min, more preferably ≥0.5 and ≤10.0 g/10 min, even more preferably ≥0.5 and ≤5.0 g/10 min, as determined in accordance with ASTM D1238 (2013) at a temperature of 190° C. under a load of 2.16 kg.

In another preferred embodiment, the iron comprises or is iron powder with a particle size of 1-100 micron, preferably 10-60 micron, more preferably 20-50 micron. Preferably, the iron is an iron powder having an average particle size $D_{50}$ of 1-100 micron, preferably 10-60 micron, more preferably 20-50 micron.

In another preferred embodiment, the polymer matrix comprises 90-95 wt. % of the film, and the remaining components comprise up to 5-10 wt. % of the film composition.

In another preferred embodiment, the film composition comprises ≥80.0 wt % of the polyolefin, preferably ≥85.0 wt %, more preferably ≥87.5 wt %, even more preferably ≥90.0 wt %, with regard to the total weight of the film composition. For example, the film composition may comprise ≥80.0 and ≤98.0 wt % of the polyolefin, preferably ≥85.0 and ≤97.5 wt %, even more preferably ≥87.5 and ≤95.0 wt %.

For example, the film composition may comprise ≥80.0 wt % of a linear low-density polyethylene (LLDPE), preferably ≥85.0 wt %, more preferably ≥87.5 wt %, even more preferably ≥90.0 wt %, with regard to the total weight of the film composition. For example, the film composition may comprise ≥80.0 and ≤98.0 wt % of the LLDPE, preferably ≥85.0 and ≤97.5 wt %, even more preferably ≥87.5 and ≤95.0 wt %.

The film composition may for example comprise ≤20.0 wt % of the scavenging components, with regard to the total weight of the film composition. In the context hereof, the scavenging components are to be understood to be the total of the iron, the ferrous sulfate heptahydrate, and glycerol, and, optionally, the electrolyte. Preferably, the film composition comprises ≤15.0 wt % of the scavenging components, more preferably ≤12.5 wt %, even more preferably ≤10.0 wt %.

The film composition may for example comprise ≥2.5 wt % of the scavenging components, preferably ≥5.0 wt %, even more preferably ≥7.5 wt %. The film composition may for example comprise ≥2.5 and ≤20.0 wt % of the scavenging components, preferably ≥2.5 and ≤15.0 wt %, more preferably ≥5.0 and ≤12.5 wt %, more preferably ≥5.0 and ≤10.0 wt %.

The film composition may for example comprise ≥2.5 wt % of the scavenging components and ≥80.0 wt % of the polyolefin, preferably the LLDPE, with regard to the total weight of the film composition. Preferably, the film composition comprises ≥5.0 wt % of the scavenging components and ≥85.0 wt % of the polyolefin, preferably the LLDPE, more preferably the film composition comprises ≥5.0 wt % and ≤12.5 wt % of the scavenging components and ≥85.0 wt % of the polyolefin, preferably the LLDPE.

The film composition may for example comprise ≥0.5 and ≤10.0 wt % of iron, with regard to the total weight of the film composition. Preferably, the film comprises ≥0.5 and ≤5.0 wt % of iron, more preferably ≥0.5 and ≤4.0 wt %, even more preferably ≥1.0 and ≤3.5 wt %, even more preferably ≥1.0 and ≤3.5 wt %, even more preferably ≥2.0 and ≤3.5 wt %, or ≥2.5 and ≤5.0 wt %.

The film composition may for example comprise ≥0.5 and ≤10.0 wt % of iron, wherein the iron is iron powder, with regard to the total weight of the film composition. Preferably, the film comprises ≥0.5 and ≤5.0 wt % of iron, wherein the iron is iron powder, more preferably ≥0.5 and ≤4.0 wt %, even more preferably ≥1.0 and ≤3.5 wt %, even more preferably ≥1.0 and ≤3.5 wt %, even more preferably ≥2.0 and ≤3.5 wt %, or ≥2.5 and ≤5.0 wt %.

The film composition may for example comprise ≥0.5 and ≤10.0 wt % of iron, wherein the iron is iron powder having and average particle size $D_{50}$ of 1-100 micron, preferably 20-50 micron, with regard to the total weight of the film composition. Preferably, the film comprises ≥0.5 and ≤5.0 wt % of iron, wherein the iron is iron powder having and average particle size $D_{50}$ of 1-100 micron, preferably 20-50 micron, more preferably ≥0.5 and ≤4.0 wt %, even more preferably ≥1.0 and ≤3.5 wt %, even more preferably ≥1.0 and ≤3.5 wt %, even more preferably ≥2.0 and ≤3.5 wt %, or ≥2.5 and ≤5.0 wt %.

The film composition may for example comprise ≥0.5 and ≤10.0 wt % of ferrous sulfate heptahydrate, with regard to the total weight of the film composition. Preferably, the film comprises ≥0.5 and ≤5.0 wt % of ferrous sulfate heptahydrate, more preferably ≥0.5 and ≤4.0 wt %, even more preferably ≥1.0 and ≤3.5 wt %, even more preferably ≥1.0 and ≤3.5 wt %, even more preferably ≥2.0 and ≤3.5 wt %, or ≥2.5 and ≤5.0 wt %.

The film composition may for example comprise ≥0.5 and ≤10.0 wt % of glycerol, with regard to the total weight of the film composition. Preferably, the film comprises ≥0.5 and ≤5.0 wt % of glycerol, more preferably ≥0.5 and ≤4.0 wt %, even more preferably ≥1.0 and ≤3.5 wt %, even more preferably ≥1.0 and ≤3.5 wt %, even more preferably ≥2.0 and ≤3.5 wt %, or ≥2.5 and ≤5.0 wt %.

For example, the film composition may comprise, with regard to the total weight of the film composition:
- ≥0.5 and ≤5.0 wt % of iron, wherein the iron preferably is iron powder having and average particle size $D_{50}$ of 1-100 micron, preferably 20-50 micron, more preferably ≥0.5 and ≤4.0 wt %, even more preferably ≥1.0 and ≤3.5 wt %, even more preferably ≥1.0 and ≤3.5 wt %, even more preferably ≥2.0 and ≤3.5 wt %, or ≥2.5 and ≤5.0 wt %;
- ≥0.5 and ≤5.0 wt % of ferrous sulfate heptahydrate, more preferably ≥0.5 and ≤4.0 wt %, even more preferably ≥1.0 and ≤3.5 wt %, even more preferably ≥1.0 and ≤3.5 wt %, even more preferably ≥2.0 and ≤3.5 wt %, or ≥2.5 and ≤5.0 wt %; and
- ≥0.5 and ≤5.0 wt % of glycerol, more preferably ≥0.5 and ≤4.0 wt %, even more preferably ≥1.0 and ≤3.5 wt %, even more preferably ≥1.0 and ≤3.5 wt %, even more preferably ≥2.0 and ≤3.5 wt %, or ≥2.5 and ≤5.0 wt %.

For example, the film composition may comprise, with regard to the total weight of the film composition:
- ≥2.0 and ≤3.5 wt % of iron, wherein the iron preferably is iron powder having an average particle size $D_{50}$ of 1-100 micron, preferably 20-50 micron;
- ≥2.5 and ≤5.0 wt % of ferrous sulfate heptahydrate; and
- ≥1.0 and ≤3.5 wt % of glycerol.

For example, the film composition may comprise, with regard to the total weight of the film composition:
- ≥2.0 and ≤3.5 wt % of iron, wherein the iron is iron powder having an average particle size $D_{50}$ of 1-100 micron, preferably 20-50 micron;
- ≥2.5 and ≤5.0 wt % of ferrous sulfate heptahydrate; and
- ≥1.0 and ≤3.5 wt % of glycerol.

For example, the film composition may comprise, with regard to the total weight of the film composition:
- ≥85.0 wt % of a polyolefin, preferably LLDPE;
- ≥0.5 and ≤5.0 wt % of iron, wherein the iron preferably is iron powder having and average particle size $D_{50}$ of 1-100 micron, preferably 20-50 micron, more preferably ≥0.5 and ≤4.0 wt %, even more preferably ≥1.0 and ≤3.5 wt %, even more preferably ≥1.0 and ≤3.5 wt %, even more preferably ≥2.0 and ≤3.5 wt %, or ≥2.5 and ≤5.0 wt %;
- ≥0.5 and ≤5.0 wt % of ferrous sulfate heptahydrate, more preferably ≥0.5 and ≤4.0 wt %, even more preferably ≥1.0 and ≤3.5 wt %, even more preferably ≥2.0 and ≤3.5 wt %, or ≥2.5 and ≤5.0 wt %; and
- ≥0.5 and ≤5.0 wt % of glycerol, more preferably ≥0.5 and ≤4.0 wt %, even more preferably ≥1.0 and ≤3.5 wt %, even more preferably ≥1.0 and ≤3.5 wt %, even more preferably ≥2.0 and ≤3.5 wt %, or ≥2.5 and ≤5.0 wt %.

For example, the film composition may comprise, with regard to the total weight of the film composition:
- ≥85.0 wt % of a polyolefin, preferably LLDPE;
- ≥2.0 and ≤3.5 wt % of iron, wherein the iron preferably is iron powder having ad average particle size $D_{50}$ of 1-100 micron, preferably 20-50 micron;
- ≥2.5 and ≤5.0 wt % of ferrous sulfate heptahydrate; and
- ≥1.0 and ≤3.5 wt % of glycerol.

For example, the film composition may comprise, with regard to the total weight of the film composition:
- ≥85.0 wt % of a polyolefin, preferably LLDPE;
- ≥2.0 and ≤3.5 wt % of iron, wherein the iron is iron powder, preferably having an average particle size $D_{50}$ of 1-100 micron, preferably 20-50 micron;
- ≥2.5 and ≤5.0 wt % of ferrous sulfate heptahydrate; and
- ≥1.0 and ≤3.5 wt % of glycerol.

In another preferred embodiment, the film composition further comprising an electrolyte.

In another preferred embodiment, the electrolyte comprises up to 2.0 wt. % of the film composition. For example, the film composition may comprise up to 2.0 wt % of the electrolyte, with regard to the total weight of the film composition.

In another preferred embodiment, the electrolyte is sodium chloride.

For example, the film composition may comprise with regard to the total weight of the film composition:
- ≥85.0 wt % of a polyolefin, preferably LLDPE;
- ≥2.0 and ≤3.5 wt % of iron, wherein the iron is iron powder, preferably having an average particle size $D_{50}$ of 1-100 micron, preferably 20-50 micron;
- ≥2.5 and ≤5.0 wt % of ferrous sulfate heptahydrate;
- ≥1.0 and ≤3.5 wt % of glycerol; and
- ≤2.0 wt %, preferably ≥0.5 and ≤2.0 wt %, of an electrolyte.

For example, the film composition may comprise with regard to the total weight of the film composition:
- ≥85.0 wt % of a polyolefin, preferably LLDPE;
- ≥2.0 and ≤3.5 wt % of iron, wherein the iron is iron powder, preferably having an average particle size $D_{50}$ of 1-100 micron, preferably 20-50 micron;
- ≥2.5 and ≤5.0 wt % of ferrous sulfate heptahydrate;
- ≥1.0 and ≤3.5 wt % of glycerol; and
- ≤2.0 wt %, preferably ≥0.5 and ≤2.0 wt %, of an electrolyte, wherein the electrolyte is sodium chloride.

In a particular embodiment, the invention relates to a film composition comprising, with regard to the total weight of the film composition:
- ≥85.0 wt % of a polyolefin, wherein the polyolefin is an LLDPE having a density of ≥900 kg/m$^3$ and ≤925 kg/m$^3$, as determined in accordance with ASTM D792 (2008), and a melt mass-flow rate of ≥0.5 and ≤5.0 g/10 min, as determined in accordance with ASTM D1238 (2013) at a temperature of 190° C. under a load of 2.16 kg;
- ≥2.0 and ≤3.5 wt % of iron, wherein the iron is iron powder, preferably having an average particle size $D_{50}$ of 1-100 micron, preferably 20-50 micron;

≥2.5 and ≤5.0 wt % of ferrous sulfate heptahydrate;
≥1.0 and ≤3.5 wt % of glycerol; and
≤2.0 wt %, preferably ≥0.5 and ≤2.0 wt %, of an electrolyte, wherein the electrolyte is sodium chloride.

The invention also relates to a film comprising the film composition. The film may be a cast film, a blown film, or an oriented film. The film may be a single-layer film or a multi-layer film. For example, the film may be a 3 layer film, a ≤layer film, a 7 layer film or a 9 layer film. In those embodiments wherein the film is a multi-layer film, the film then comprises two outer layers, a core layer, and optionally intermediate layers. In those embodiments wherein the film is a multi-layer film, it is preferred that the film composition of the invention is present in the core layer and/or, if present, in one or more of the intermediate layers. In those embodiments wherein the film is a multi-layer film, it is preferred that the core layer and/or, if present, one or more of the intermediate layers consists of the film composition.

Preferably, the film composition is present in that layer of the multi-layer film that is adjacent to that outer layer of the multi-layer film that is or is to be exposed to the environment wherein the oxygen scavenging is to be taking place. Preferably, that layer of the multi-layer film that is adjacent to that outer layer of the multi-layer film that is or is to be exposed to the environment wherein the oxygen scavenging is to be taking place consists of the film composition.

The film comprising the film composition may for example have a thickness of ≥≤and ≤200 μm, preferably ≥10 and ≤100 μm, more preferably ≥20 and ≤75 μm, more preferably ≥25 and ≤50 μm.

The invention also relates to a package comprising a film comprising the film composition. For example, the invention also relates to a package comprising an enclosed space for containing a product, wherein at least a section of the walls enclosing that space contains a film, preferably a multi-layer film, comprising the film composition.

Preferably, the space is construed such that the film comprising the film composition, in the case that the film is a multi-layer film, is positioned such that the layer of the film that is adjacent to the outer layer of the film that faces towards the space that it, at least partially, enclosed, consists of the film composition of the present invention.

In another preferred embodiment, the polymer matrix comprises 20-50 wt. % of the film composition, and the remaining components comprise up to 50-80 wt. % of the film composition.

In another preferred embodiment, the film composition comprises around 90 wt. % of polymer matrix, around 3 wt. % of iron powder, around 3 wt. % of ferrous sulfate heptahydrate, around 2 wt. % glycerol, and around 2 wt. % sodium chloride.

In another preferred embodiment, a film for use in food packaging is disclosed, the film having an oxygen scavenging performance of greater than 2 mg of oxygen per gram of film.

In another preferred embodiment, the film has an oxygen scavenging performance of greater than 10 mg of oxygen per gram of film.

The following includes definitions of various terms and phrases used throughout this specification.

The terms "about" or "approximately" are defined as being close to as understood by one of ordinary skill in the art. In one non-limiting embodiment, the terms are defined to be within 10%, preferably within 5%, more preferably within 1%, and most preferably within 0.5%.

The terms "wt. %", "vol. %", or "mol. %" refers to a weight percentage of a component, a volume percentage of a component, or molar percentage of a component, respectively, based on the total weight, the total volume of material, or total moles, that includes the component. In a non-limiting example, 10 grams of component in 100 grams of the material is 10 wt. % of component.

The term "substantially" and its variations are defined to include ranges within 10%, within 5%, within 1%, or within 0.5%.

The terms "inhibiting" or "reducing" or "preventing" or "avoiding" or any variation of these terms, when used in the claims and/or the specification includes any measurable decrease or complete inhibition to achieve a desired result.

The term "effective," as that term is used in the specification and/or claims, means adequate to accomplish a desired, expected, or intended result.

The use of the words "a" or "an" when used in conjunction with any of the terms "comprising," "including," "containing," or "having" in the claims, or the specification, may mean "one," but it is also consistent with the meaning of "one or more," "at least one," and "one or more than one."

The words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The inventive compositions can "comprise," "consist essentially of," or "consist of" particular ingredients, components, compositions, etc. disclosed throughout the specification. With respect to the transitional phrase "consisting essentially of," in one non-limiting aspect, a basic and novel characteristic of the compositions is that processed into thin films and exhibit an improved oxygen scavenging capability for use in food packaging applications.

Other objects, features and advantages of the present invention will become apparent from the following figures, detailed description, and examples. It should be understood, however, that the figures, detailed description, and examples, while indicating specific embodiments of the invention, are given by way of illustration only and are not meant to be limiting. Additionally, it is contemplated that changes and modifications within the spirit and scope of the invention will become apparent to those skilled in the art from this detailed description. In further embodiments, features from specific embodiments may be combined with features from other embodiments. For example, features from one embodiment may be combined with features from any of the other embodiments. In further embodiments, additional features may be added to the specific embodiments described herein.

In this invention, transparent/translucent thin films can be formed using novel oxygen scavenging polymeric compositions that possess an improved oxygen scavenging capability. A preferred composition of the film comprises iron powder, ferrous sulfate heptahydrate ($FeSO_4 \cdot 7H_2O$) and glycerol dispersed in polyethylene. Such compositions are useful for packaging films.

The addition of glycerol can improve the oxygen scavenging ability of the oxygen scavenging components (Fe+ auxiliary additives), especially with higher loading of oxygen scavenging components. Further, glycerol addition significantly improves the dispersion of the inorganic oxygen scavenging components and the overall processability of the formulation.

In general, films without glycerol experienced difficulty in melt processing and moulding. A preferred composition uses polyethylene as a base matrix for melt blending with oxygen scavenging additives. Such additives can include but are not limited to iron powder and $FeSO_4 \cdot 7H_2O$. The preferred composition exhibits an improved oxidation of iron in the film, facilitated by glycerol, which also helps to disperse the iron powder and ferrous sulfate heptahydrate uniformly within the PE matrix. The further addition of an electrolyte, such as sodium chloride, can provide additional benefits.

The specific features/components of a preferred embodiment of the invention that can exemplified with the compositions outlined in the table below.

TABLE 1

Different components of the preferred embodiment.

| Component | Option used in invention | Percentage by weight |
|---|---|---|
| Polymer (base matrix of Oxygen Scavenging film for active packaging) | Polyethylene (PE)- LDPE, LLDPE, Polyethylene-graft-maleic anhydride (PE-g-MA) (0.1 mol % Maleic Anhydride) | 98-88% |
| Oxygen Scavenger | Iron powder | 0.5-5% |
| Oxygen Scavenger | Ferrous Sulfate Heptahydrate | 0.5-5% |
| Oxidation Reaction medium and dispersing aid | Glycerol | 1-2% |

The present invention will be described in greater detail by way of specific examples. The following examples are offered for illustrative purposes only, and are not intended to limit the invention in any manner. Those of skill in the art will readily recognize a variety of noncritical parameters which can be changed or modified to yield essentially the same results.

The following materials were used in the examples:

| | |
|---|---|
| PE-1 | LLDPE 118NE, obtainable from SABIC |
| PE-2 | MA-g-LLDPE, an LLDPE grafted with maleic anhydride, comprising 0.1 mol % of maleic anhydride, obtainable from SABIC |
| Fe | Iron powder, 325 mesh, obtainable from Sigma Aldrich |
| $FeSO_4$ | Ferrous sulfate heptahydrate |
| GL | Glycerol |
| NaCl | Sodium Chloride |

As a first step, oxygen scavenger (OS) additive compositions are pre-blended. A mortar and pestle was used to crush a weighed amount of ferrous sulfate heptahydrate crystals. The required amount of iron powder, crushed ferrous sulfate heptahydrate and glycerol were weighed in separate vials. Iron powder and crushed ferrous sulfate heptahydrate powder were then thoroughly mixed in a beaker with a spatula. To this solid mixture, glycerol was added and mixed with the spatula for 1-2 min under a nitrogen blanket until a consistent dark colour pasty mass was obtained. To this pasty mixture, a portion of LLDPE pellets was added with vigorous stirring with the spatula, until the surface of the pellets are uniformly (mostly) coated/moistured with the pasty mass. This step was then repeated with the remaining lot of LLDPE. The pasty mass coated LLDPE was then thoroughly mixed in a plastic bag and kept under a nitrogen blanket until melt mixing.

Melt Mixing via HAAKE Mixer.

A number of polymer formulations were prepared by mixing of ingredients in a HAAKE mixer according to the procedure as herein below. These compositions are indicated in the table 2 below by "H" under mixing type. Desired amount of additives (iron powder, ferrous sulfate heptahydrate powder and glycerol) were weighed and physically blended with weighed amount of polyethylene (for example, LLDPE 118NE). Such physically blended components were further melt processed in a HAAKE mixer for obtaining melt mixed compositions. This material was subsequently compression moulded into thin films. In commercial applications, the moulding could be by various methods. Table 2 gives the details of the formulations along with their oxygen scavenging capabilities, as measured by a GC headspace analysis method.

Melt Mixing via Twin-Screw Extrusion

A number of polymer formulations were prepared by mixing of ingredients in a ZSK twin-screw extruder according to the procedure as herein below. These compositions are indicated in the table 2 below by "Z" under mixing type. This was accomplished with a 10-barrel twin-screw extruder set-up. In this instance, the extruder was made by Coperion, and was their ZSK 25 mm extruder fitted with co-rotating screws. The extruder set-up was purged with LLDPE for a time ranging from thirty minutes to one hour, until no (or minimal) black particles were seen in the strand. An inventive strand was then extruded using a temperature profile as follows: 100, 160, 185, 195, 200, 205, 205, 210, 210, 220° C. The extrusion was done at 250 rpm, with a feed rate of 5.6 Kg/hour. After over-night storage at room temperature, the strands were pelletized.

TABLE 2

Formulation of polymer compositions

| Example | Mixing Type | Polymer Type | Polymer Qty | Fe | $FeSO_4$ | GL | NaCl |
|---|---|---|---|---|---|---|---|
| 1 | — | — | — | — | — | — | — |
| 2 | Z | PE-1 | 100.0 | — | — | — | — |
| 3 | Z | PE-2 | 100.0 | — | — | — | — |
| 4 | — | — | — | 100.0 | — | — | — |
| 5 | Z | PE-1 | 80.0 | 20.0 | — | — | — |
| 6 | Z | PE-1 | 95.0 | — | — | 5.0 | — |
| 7 | Z | PE-1 | 90.0 | 3.0 | 5.0 | 2.0 | — |
| 8 | Z | PE-1 | 93.0 | — | 5.0 | 2.0 | — |
| 9 | H | PE-1 | 89.0 | — | 1.0 | 10.0 | — |
| 10 | H | PE-1 | 88.0 | — | 6.0 | 6.0 | — |
| 11 | Z | PE-1 | 93.0 | — | 5.0 | 2.0 | — |
| 12 | Z | PE-1 | 95.0 | 1.5 | 2.5 | 1.0 | — |
| 13 | H | PE-1 | 95.0 | 2.0 | 2.0 | 1.0 | — |
| 14 | H | PE-1 | 94.0 | 3.0 | 2.0 | 1.0 | — |
| 15 | H | PE-1 | 80.0 | 5.0 | 10.0 | 5.0 | — |
| 16 | Z | PE-1 | 75.0 | 10.0 | 10.0 | 5.0 | — |

TABLE 2-continued

Formulation of polymer compositions

| Example | Mixing Type | Polymer Type | Polymer Qty | Fe | FeSO$_4$ | GL | NaCl |
|---|---|---|---|---|---|---|---|
| 17 | Z | PE-1 | 80.0 | 10.0 | 10.0 | — | — |
| 18 | Z | PE-1 | 92.0 | 3.0 | 5.0 | — | — |
| 19 | Z | PE-1 | 91.8 | 3.0 | 5.0 | 0.2 | — |
| 20 | Z | PE-1 | 94.5 | 2.0 | 3.0 | 0.5 | — |
| 21 | H | PE-1 | 88.0 | 5.0 | 5.0 | 2.0 | — |
| 22 | Z | PE-1 | 90.0 | 3.0 | 3.0 | 2.0 | 2.0 |
| 23 | H | PE-2 | 90.0 | 3.0 | 5.0 | 2.0 | |
| 24 | H | PE-2 | 88.0 | 5.0 | | 5.0 | 2.0 |
| 25 | H | PE-2 | 92.0 | 1.0 | | 5.0 | 2.0 |

In the above table, the quantities of the ingredients indicate the wt % of each of the ingredients with regard to the total weight of the formulation.

The next step was to take the extruded pellets and subsequently compression mould them. This was accomplished using a SANTEC moulding machine, with a plate temperature of 200° C., and the following conditions:

Holding pressure: 110 bar
Pre-heating time: 2 min
Breathing time: 3 times each 1 sec
Holding/curing time: 5 min
Cooling time: 5 min
Supporting material: Teflon coated flexible Al-sheet (0.15 mm) on top and bottom
Thickness of the compression moulded film=140-180 microns
Size: 120×120 mm (Two films of each compositions are made)

The compression-moulded films were wrapped with Al-foil to prevent exposure to open atmosphere.

Using compression moulded samples as prepared above of sample formulations 2,3 and 5-22, and samples of a blank atmosphere (1) and pure iron powder (4), the oxygen absorbing capacity of the formulations was determined via gas chromatography (GC) headspace analysis.

For determination of oxygen absorption, a specimen of ca. 0.20 g, weighed to 3 digit accuracy, of each of the samples were each placed in a GC vial having a volume of 20 ml, which contained a 1 ml vial comprising water, in order to maintain 100% relative humidity in the vial. The vials were sealed with a Teflon cap, so as to form a closed container comprising an air atmosphere, the sample and water. The test vials were placed in an oven at 65° C. for 72 hours to simulate accelerated aging conditions.

After aging, the atmosphere in the test vials was analysed via gas chromatography using an Agilent 7890 B gas chromatographer and a 7697A headspace sampler. The GC was equipped with Carboxen ® (Sigma-Aldrich Co., USA) plot 1010 column of dimensions 30 m (length)×0.53 mm (internal diameter)×30 μm (film thickness) and a TCD detector. An isothermal oven temperature was set at 35° C. for 10 minutes. The inlet and detector temperature were maintained at 250° C. The sample vials were placed in the headspace samples while maintaining oven temperature at 50° C. for 1 min, and then samples of the atmosphere in each vial were subjected to GC analysis to determine the composition of the atmosphere in each vial. By comparing the oxygen content in the atmosphere of each sample as thus determined with the oxygen content of the blank sample 1, the absorbed oxygen quantity per g of the compression moulded film could be determined, providing the oxygen scavenging capacity of the polymer formulations of the present invention.

The results of the GC headspace oxygen analyses of the aged samples is presented in the table 3 below.

TABLE 3

| | Oxygen absorption | | | | | | | | | | |
|---|---|---|---|---|---|---|---|---|---|---|---|
| Example | 1 | 2 | 3 | 4 | 5 | 6 | 7 | 8 | 9 | 10 | 11 |
| O$_2$ absorption | 0.0 | 0.0 | 0.0 | 0.0 | 0.0 | 0.0 | 10.8 | 2.1 | 0.0 | 3.0 | 2.1 |
| Example | 12 | 13 | 14 | 15 | 16 | 17 | 18 | 19 | 20 | 21 | 22 |
| O$_2$ absorption | 2.6 | 2.9 | 4.7 | 9.9 | 19.6 | 14.0 | 6.5 | 5.5 | 3.8 | 10.0 | 13.7 |
| Example | | | | | 23 | | | 24 | | 25 | |
| O$_2$ absorption | | | | | 6.4 | | | 1.8 | | 0.7 | |

In this table 3, the O$_2$ absorption reflects the quantity of O$_2$ absorbed from the atmosphere in the vial, in mg, related to 1.00 g of the sample material.

From the above results, the following may be observed.

The examples 2 and 3 show that pure polyethylene does not scavenge any oxygen, nor does pure iron powder (example 4), or iron powder in a PE film without any other scavenger additive (example 5). Also, glycerol used in PE film does not absorb any oxygen (example 6).

Example 7 shows that using a combination of Fe, FeSO$_4$ and glycerol in a PE film, thus using a formulation according to the present invention, does provide a significant oxygen absorption. The examples 8, 10 and 11 show that a limited oxygen scavenging effect can be obtained by using a combination of FeSO$_4$ with glycerol, however if the quantity of FeSO$_4$ is too low, no absorption occurs, as shown by example 9.

The examples 12-15 and 7 show the optimal loading of iron powder for maximum efficiency. It indicates an improvement of oxygen scavenging performance from 2.9 mg/g to 4.7 mg/g by increasing the loading of iron powder from 2.0 wt % to 3.0 wt %. In general, it can be observed that as iron content is increased along with $FeSO_4$ content, the oxygen scavenging performance increases up to 10.8 mg/g.

Based on the results, is can be observed that a particularly desirable oxygen scavenging performance of over 10.0 mg/g of film can be achieved with a relatively low quantity of loading, such as with a total loading of 10.0 wt % or less. Higher scavenging properties can also be achieved, however then the total loading is to exceed 10.0 wt %, which may result in a deterioration of visual appearance of the film.

A further advantageous effect may be observed from the addition of a fraction of an electrolyte such as NaCl, which further contributes to the oxygen scavenging performance of a film comprising a composition of Fe, $FeSO_4$ and glycerol, as exemplified by example 22, reaching an oxygen absorption value of 13.7 mg/g film.

SEM studies of the samples were carried out using a ZEISS® (Carl Zeiss Corporation, Germany) EVO-18 scanning electron microscope. SEM images were taken under secondary electron mode with an operating voltage of 10 kV. All the samples were air cleaned and coated with 10nm gold prior to imaging. Imaging showed that the iron powder and $Fe_2SO_4.7H_2O$ was indeed uniformly dispersed in the sample.

The following aspects also present certain embodiments of the invention.

Aspect 1: A film composition comprising:
a polymer matrix, preferably a polyolefin;
iron;
ferrous sulfate heptahydrate; and,
glycerol.

Aspect 2: The film composition of aspect 1, wherein:
the polymer matrix is selected from the group comprising:
polyethylene;
polypropylene;
a polyethylene grafted compound; or,
a mixture of these.

Aspect 3: The film composition of aspect 2, wherein:
the polyethylene is selected from the group comprising:
high density polyethylene;
medium density polyethylene;
low density polyethylene;
very low density polyethylene;
ultra-low density polyethylene; or,
linear low density polyethylene.

Aspect 4: The film composition of aspect 2, wherein:
the polyethylene grafted compound comprises maleic anhydride grafted polyethylene.

Aspect 5: The film composition of aspect 1, wherein:
the polymer matrix comprises maleic anhydride grafted polyethylene mixed with polyethylene.

Aspect 6: The film composition of aspect 1, wherein:
the iron comprises iron powder with a particle size of 1-100 micron, preferably 10-60 micron, more preferably 20-50 micron.

Aspect 7: The film composition of aspect 1, wherein:
the polymer matrix comprises 90-95 wt. % of the film, and the remaining components comprise up to 5-10 wt. % of the film composition.

Aspect 8: The film composition of aspect 1, further comprising an electrolyte.

Aspect 9: The film composition of aspect 8, wherein the electrolyte comprises up to 2.0 wt. % of the film composition.

Aspect 10: The film composition of aspect 9, wherein the electrolyte is sodium chloride.

Aspect 11: The film composition of aspect 1, wherein:
the polymer matrix comprises 20-50 wt. % of the film composition, and the remaining components comprise up to 50-80 wt. % of the film composition.

Aspect 12: The film composition of aspect 10, wherein:
the polymer matrix comprises 20-50 wt. % of the film composition, and the remaining components comprise up to 50-80 wt. % of the film composition.

Aspect 13: The film composition of aspect 12, wherein the film composition comprises around 90 wt. % of polymer matrix, around 3 wt. % of iron powder, around 3 wt. % of ferrous sulfate heptahydrate, around 2 wt. % glycerol, and around 2 wt. % sodium chloride.

Aspect 14: A film for use in food packaging, the film having an oxygen scavenging performance of greater than 2 mg of oxygen per gram of film.

Aspect 15: The film of aspect 14, wherein the film has an oxygen scavenging performance of greater than 10 mg of oxygen per gram of film.

Aspect 16: The film of aspect 14, wherein the film comprises:
a polymer matrix;
iron powder;
ferrous sulfate heptahydrate; and,
glycerol.

Aspect 17: The film of aspect 16, further comprising sodium chloride.

Aspect 18: The film of aspect 16, wherein:
the polymer matrix comprises 90-95 wt. % of the film, and the remaining components comprise up to 5-10 wt. % of the film.

Aspect 19: The film of aspect 17, wherein:
the polymer matrix comprises 90-95 wt. % of the film, and the remaining components comprise up to 5-10 wt. % of the film.

Aspect 20: The film of aspect 19, wherein the film comprises:
around 90 wt. % of polymer matrix;
around 3 wt. % of iron powder;
around 3 wt. % of ferrous sulfate heptahydrate;
around 2 wt. % glycerol; and,
around 2 wt. % sodium chloride.

The invention claimed is:

1. A film composition comprising:
a polymer matrix comprising ≥80.0 wt % of a polyolefin, with regard to the total weight of the film composition;
iron;
ferrous sulfate heptahydrate;
glycerol; and
optionally, an electrolyte.

2. The film composition according to claim 1, wherein the composition comprises, with regard to the total weight of the film composition:
≥0.5 and ≤10.0 wt %, of the iron; and/or
≥0.5 and ≤10.0 wt %, of the ferrous sulfate heptahydrate; and/or
≥0.5 and ≤10.0 wt %, of the glycerol.

3. The film composition according to claim 1, wherein the film comprises a quantity of the scavenging components of ≤20.0 wt %, with regard to the total weight of the film composition, wherein the quantity of the scavenging components is defined as the sum of the weight of the iron, the ferrous sulfate heptahydrate, the glycerol, and the electrolyte.

4. The film composition of claim 1, wherein:
the polymer matrix comprises at least one of polyethylene, polypropylene; or
a polyethylene grafted compound.

5. The film composition of claim 1, wherein:
the iron is an iron powder with a particle size of 1-100 micron.

6. The film composition according to claim 1, wherein the film composition comprises up to 2.0 wt. % of the electrolyte.

7. The film according to claim 1, wherein the polyolefin is a linear low-density polyethylene having:
a density of ≥900 and ≤925 kg/m$^3$, as determined in accordance with ASTM D792 (2008); and/or
a melt mass-flow rate of ≥0.1 and ≤20.0 g/10 min, as determined in accordance with ASTM D1238 (2013), at a temperature of 190° C. under a load of 2.16 kg.

8. The film composition of claim 1, wherein the composition comprises, with regard to the total weight of the film composition:
≥0.5 and ≤5.0 wt %, of the iron,
≥0.5 and ≤5.0 wt %, of the ferrous sulfate heptahydrate; and
≥0.5 and ≤10.0 wt %, of the glycerol.

9. The film composition according to claim 1, wherein the film composition comprises of ≥0.5 and ≤2.0 wt %, of the electrolyte.

10. The film according to claim 1, wherein the electrolyte is sodium chloride.

11. A film for use in food packaging, wherein the film comprises the film composition according to claim 1.

12. The film according to claim 11, wherein the film is a single-layer film or a multi-layer film.

13. The film according to claim 11, wherein the film has a thickness of ≥5 and ≤200 μm.

14. The film according to claim 11, wherein the film has an oxygen scavenging performance of greater than 2 mg of oxygen per gram of film.

15. The film according to claim 11, wherein the film is a multi-layer film comprising the film composition in a layer of the multi-layer film that is adjacent to that an outer layer of the multi-layer film that is or is to be exposed to the environment wherein oxygen scavenging is to be taking place.

16. The film according to claim 15, wherein the layer of the multi-layer film that is adjacent to that outer layer of the multi-layer film that is or is to be exposed to the environment wherein oxygen scavenging is to be taking place consists of the film composition.

17. Package comprising the film according to claim 11.

18. The package according to claim 17, wherein the comprises an enclosed space for containing a product, wherein at least a section of the walls enclosing that space contains a film comprising the film composition.

* * * * *